(12) United States Patent
Satoh et al.

(10) Patent No.: US 7,612,960 B2
(45) Date of Patent: Nov. 3, 2009

(54) METHOD FOR FORMATTING DATA SECTORS ON MAGNETIC DISK, AND MAGNETIC DISK DRIVE

(75) Inventors: Naoki Satoh, Kanagawa (JP); Terumi Takashi, Kanagawa (JP); Hitoshi Ogawa, Kanagawa (JP); Hiroyuki Tsuchinaga, Tokyo (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 329 days.

(21) Appl. No.: 11/271,365

(22) Filed: Nov. 9, 2005

(65) Prior Publication Data

US 2006/0114588 A1    Jun. 1, 2006

(30) Foreign Application Priority Data

Nov. 29, 2004   (JP)   ............................. 2004-343587

(51) Int. Cl.
*G11B 5/09* (2006.01)
(52) U.S. Cl. .................. 360/48; 360/53; 360/77.02; 360/78.04
(58) Field of Classification Search .................. None
See application file for complete search history.

(56) References Cited

U.S. PATENT DOCUMENTS

| 5,253,124 | A | * | 10/1993 | Kondo et al. | ................. 360/48 |
| 5,446,718 | A | * | 8/1995 | Shimizu et al. | .......... 369/59.26 |
| 5,523,903 | A | * | 6/1996 | Hetzler et al. | ............ 360/77.08 |
| 5,675,694 | A | * | 10/1997 | Nakajima et al. | ............. 386/86 |
| 5,768,044 | A | * | 6/1998 | Hetzler et al. | ............ 360/77.08 |
| 6,049,436 | A | * | 4/2000 | Wu | ............................ 360/27 |
| 6,081,399 | A | * | 6/2000 | Lee et al. | ..................... 360/75 |
| 6,091,559 | A | * | 7/2000 | Emo et al. | .................... 360/48 |
| 6,137,644 | A | * | 10/2000 | Hetzler et al. | ................. 360/48 |
| 6,260,257 | B1 | * | 7/2001 | Emo et al. | .............. 29/603.09 |
| 6,304,398 | B1 | * | 10/2001 | Gaub et al. | ................... 360/49 |
| 6,393,511 | B1 | * | 5/2002 | Albrecht et al. | ................ 711/4 |
| 6,487,029 | B1 | * | 11/2002 | Wu | ............................ 360/27 |
| 6,611,390 | B1 | * | 8/2003 | Egan | ........................... 360/31 |
| 6,865,042 | B2 | * | 3/2005 | Dunn et al. | ................... 360/48 |

(Continued)

FOREIGN PATENT DOCUMENTS

JP    10-040657    2/1998

(Continued)

*Primary Examiner*—Hoa T Nguyen
*Assistant Examiner*—Dismery E Mercedes
(74) *Attorney, Agent, or Firm*—Townsend and Townsend and Crew LLP (57) ABSTRACT

Embodiments of the present invention efficiently format long sectors, without decreasing the performance, in a magnetic disk drive in which servo sectors are radially formed at regular intervals, and make full use of the ECC performance that is enhanced by the long sectors. In one embodiment, a data format in each zone on a magnetic disk is completed by a plurality of tracks N (N is an integer, which is 2 or more). The storage capacity per track of the outermost radius zone Z#1 is 150 kB. In this zone, long sectors each having a length of 32 kB are formatted with the number of tracks per format N#1=3. The storage capacity per track of the innermost radius zone Z#m is 80 kB. In this zone, long sectors each having a length of 32 kB are formatted with the number of tracks per format N#m=2.

16 Claims, 7 Drawing Sheets

U.S. PATENT DOCUMENTS

| | | | |
|---|---|---|---|
| 6,879,454 B2 * | 4/2005 | Winarski et al. | 360/60 |
| 6,925,526 B2 * | 8/2005 | Hall | 711/113 |
| 7,012,771 B1 * | 3/2006 | Asgari et al. | 360/31 |
| 7,076,603 B1 * | 7/2006 | Chheda | 711/111 |
| 2003/0007276 A1 * | 1/2003 | Satoh | 360/63 |
| 2003/0035239 A1 * | 2/2003 | Ottesen et al. | 360/78.06 |
| 2004/0136104 A1 * | 7/2004 | Chiao et al. | 360/31 |
| 2005/0097267 A1 * | 5/2005 | Chen et al. | 711/112 |

FOREIGN PATENT DOCUMENTS

| | | |
|---|---|---|
| JP | 2002-288943 | 10/2002 |

* cited by examiner

Configuration in which track following
is spirally performed

Fig. 2 B

Configuration in which track following
is concentrically performed

METHOD FOR FORMATTING DATA SECTORS ON MAGNETIC DISK, AND MAGNETIC DISK DRIVE

CROSS-REFERENCES TO RELATED APPLICATIONS

This application claims priority from Japanese Patent Application No. JP2004-343587, filed Nov. 29, 2004, the entire disclosure of which is incorporated herein by reference.

BACKGROUND OF THE INVENTION

The present invention relates to an information recording and reproducing device, such as a magnetic disk drive, in which servo sectors are radially formed on a disk-shaped recording medium at regular intervals, and more particularly to a method for efficiently formatting long data sectors (hereinafter abbreviated as "long sector").

For example, it is assumed that in a magnetic disk drive that uses a magnetic disk having a diameter of 1.0 inch (a diameter of 25.4 mm) as a recording medium (hereinafter referred to as "1.0-HDD"), a certain track has a data area, the round length of which is 80 kB (kilobyte). In this case, if the length of one data sector which is the minimum unit of read and write is as short as about 500 B (byte), the influence of a sector corresponding to the end of a round, which is exerted upon the format efficiency, is small.

It is assumed that after a round of a track, an area, the size of which is almost equivalent to one data sector, could not be formatted at a position of the end sector. In this case, if the format efficiency as a result of losses of an ECC and of a servo area is at least 80%, reduction of the format efficiency as a result of an area loss which is a little less than one data sector is as small as 0.5%=80×(1×0.5)/80.

However, a magnetic disk having a data sector whose length is as small as about 500 B has many gap areas between data sectors. Since fluctuations in revolution or the like require a long gap area, the format efficiency is decreased. Moreover, the ECC capability for each short data sector is unlikely to expect the sufficient performance enough to meet a request to reduce a bit error rate (BER) in response to future high density.

For this reason, what is considered is a long sector in which by lengthening a data sector which is the minimum unit of read and write, the number of gap areas is decreased so as to reduce a format loss factor such as fluctuations in revolution, and in which adding an ECC to a long data sector makes it possible to improve the ECC capability. The technology relating to this is detailed in patent document 1 (Japanese Patent Laid-Open No. 2002-288943).

BRIEF SUMMARY OF THE INVENTION

Figure 7:
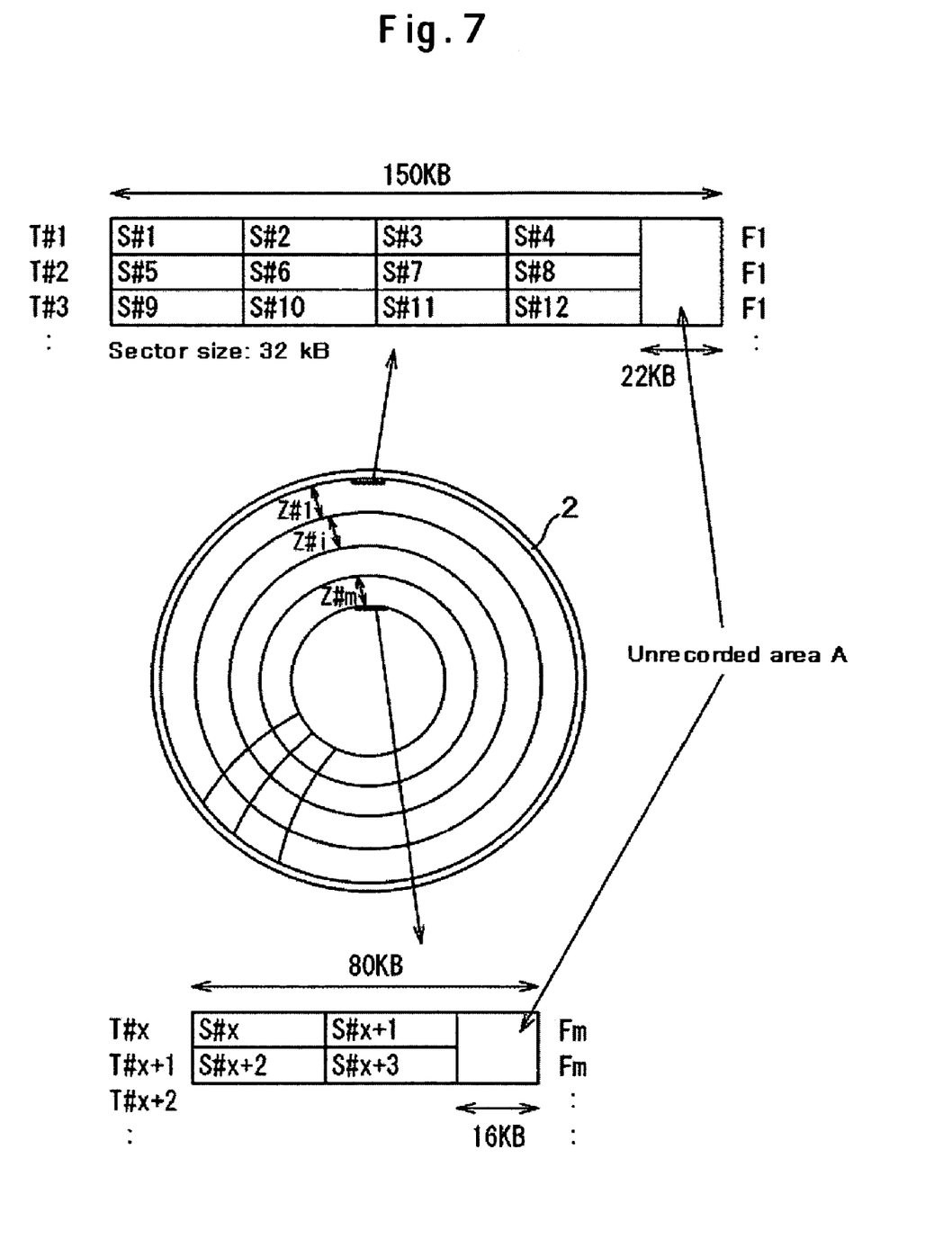
FIG. 7 is a diagram illustrating how a data format is configured if long sectors are formatted according to the prior art.

FIG. 7 is a diagram illustrating an example of formatting 32-kB long sectors applied to a DVD (digital video disc) of a 1.0-HDD using the prior art. In the prior art, data sectors (S#1, S#2, ..., S#12, ...) are formatted in such a manner that no data sector is separated by a boundary between tracks. To be more specific, a format of a disk 2 is completed at the end of each round of the disk. In addition, the magnetic disk 2 is radially divided into a plurality of zones (Z#1, Z#2, ..., Z#m) so as to avoid the recording density on the inner circumferential diameter side from largely differing from that on the outer circumferential diameter side. In this case, the number of zones is m.

In general, when long sectors are applied, an improvement in format efficiency is achieved by eliminating a loss factor caused by rotational fluctuations between data sectors, and the like. However, because one data sector is long in this format, new format problems arise as below.

In the innermost radius zone Z#m, all tracks from a track T#x to the innermost radius of the zone are formatted in a sector format Fm. Likewise, in the outermost radius zone Z#1, all tracks are formatted in a sector format F1.

In the innermost radius zone Z#m, if one round corresponds to an area to which data having a length of about 80 kB can be written, the one round has a write area in which about 2.5 sectors are included. However, the conventional formatting method, a format of which is completed at the end of each track, can format only two data sectors (S#x and S#x+1). The size of an unrecorded area A, which is equivalent to 0.5 data sectors, is as long as 16 kB per track. Accordingly, on the assumption that the format efficiency of data sectors each having a length of about 500 B is 80% using the conventional formatting method, the format efficiency at the time of formatting long sectors each having a length of 32 kB is about 64% (=80×(32×2)/80), showing that the format efficiency decreased by as much as 16%.

Likewise, also in the zone Z#1 on the outermost radius side, if one round corresponds to the capacity of about 150 kB, the one round has an area in which about 4.7 sectors are included. However, because the number of data sectors which can be assigned to one track is only four, the format efficiency of this area is 80×(32×4)/150=68.3%, which is a loss of about 12%.

In a track (zone) that has such an unformattable area, it could be conceivable that a loss may be reduced by decreasing the recording density. However, a problem arising in this case is that the linear recording density largely changes between zones adjacent to each other. For example, on the assumption that there is a zone Z#i which is efficiently formatted with three data sectors, and that an outer circumferential diameter zone Z#i-1 adjacent to the zone Z#i is formatted. In the zone Z#i-1, if two data sectors are assigned without a format loss in a direction in which the recording density does not increase, the recording density of the zone Z#i-1 at the boundary with the zone Z#i is as very low as less than two thirds of the recording density of the adjacent zone Z#i. When long sectors are adopted, if the number of sectors in one track is few, the HDD is provided with the badly balanced recording density as a result.

The degradation in format efficiency by 1% is almost equivalent to the degradation in signal quality by 0.2 dB. Accordingly, the degradation in format efficiency by about 15% is equivalent to the degradation in signal quality by about 3 dbdB. This degradation cannot be recovered even if long sectors are applied to improve a loss of the gap between data sectors, or even if an enhanced error correction code (ECC), which is adopted in DVD, is applied. To be more specific, it is found out that even if long sectors are applied to a small-diameter disk such as a 1.0-HDD according to the prior art, effects of the long sectors are counteracted by a format loss because unformattable areas exist.

Incidentally, the description was above made of the case where long sectors each having 32 kB are applied to a small-diameter HDD such as the 1.0-HDD. However, as described in the following embodiments, not only a HDD having a diameter of 0.85 inch, but also a HDD having a diameter of 1.8, 2.5, or 3.5 inch, have, more or less, the problem of the degradation in format efficiency if long sectors each having a length of 4 kB or more are applied to the small-diameter HDD.

A feature of the present invention is to efficiently format long sectors, without decreasing the performance, in a magnetic disk drive in which servo sectors are radially formed at regular intervals. Another feature of the present invention is to make full use of the ECC performance that is enhanced by the long sectors.

According to one aspect of the present invention, there is provided a method for formatting data sectors on a magnetic disk having a plurality of tracks, each of the plurality of tracks being divided into a plurality of zones in a radial direction, the method comprising the step of formatting, on a zone basis, data sectors in units of N tracks (N is an integer, which is 2 or more).

In some embodiments, the data sectors are continuously formatted in the tracks, the number of which is N. It is desirable that the tracks be spirally and continuously formed. The tracks are concentrically formed, and each track has physically divided data sectors. A value of N differs on a zone basis. A diameter of the magnetic disk is 25.4 mm or less, and the length of one data sector is 4 kB or more.

The method for formatting data sectors on a magnetic disk includes the steps of: identifying a zone that includes a track number of a data sector from which read or write of the magnetic disk is started; identifying the number of tracks N corresponding to the zone; converting the track number into a zone-specific track number in the zone; performing modulo N arithmetic of the zone-specific track number by the number of tracks N of the zone; and determining a track format in the zone in question from the identified zone and the result of the modulo arithmetic.

According to another aspect of the present invention, there is provided a magnetic disk drive comprising: a magnetic disk having a plurality of tracks, each of the plurality of tracks being divided into a plurality of zones in a radial direction, data sectors being formatted, on a zone basis, in units of N tracks (N is an integer, which is 2 or more); a spindle for supporting and rotating the magnetic disk; and a magnetic head that is positioned at a recording track of the magnetic disk so as to write/read data to/from the data sector.

In some embodiments, the data sectors are continuously formatted in the tracks, the number of which is N. It is desirable that the tracks be spirally and continuously formed. The tracks are concentrically formed, and each track has physically divided data sectors. A value of N differs on a zone basis. A diameter of the magnetic disk is 25.4 mm or less, and the length of one data sector is 4 kB or more.

According to the present invention, it is possible to apply long sectors to a format of a magnetic disk drive with a high degree of format efficiency. In addition, great effects of ECC are produced by applying long sectors, which makes it possible to realize a magnetic disk drive that is tolerant to defects on a magnetic disk. Moreover, when applying long sectors to small-diameter HDDs such as 0.85-HDD and 1.0-HDD, the present invention is particularly effective.

DETAILED DESCRIPTION OF THE INVENTION

Figure 1:
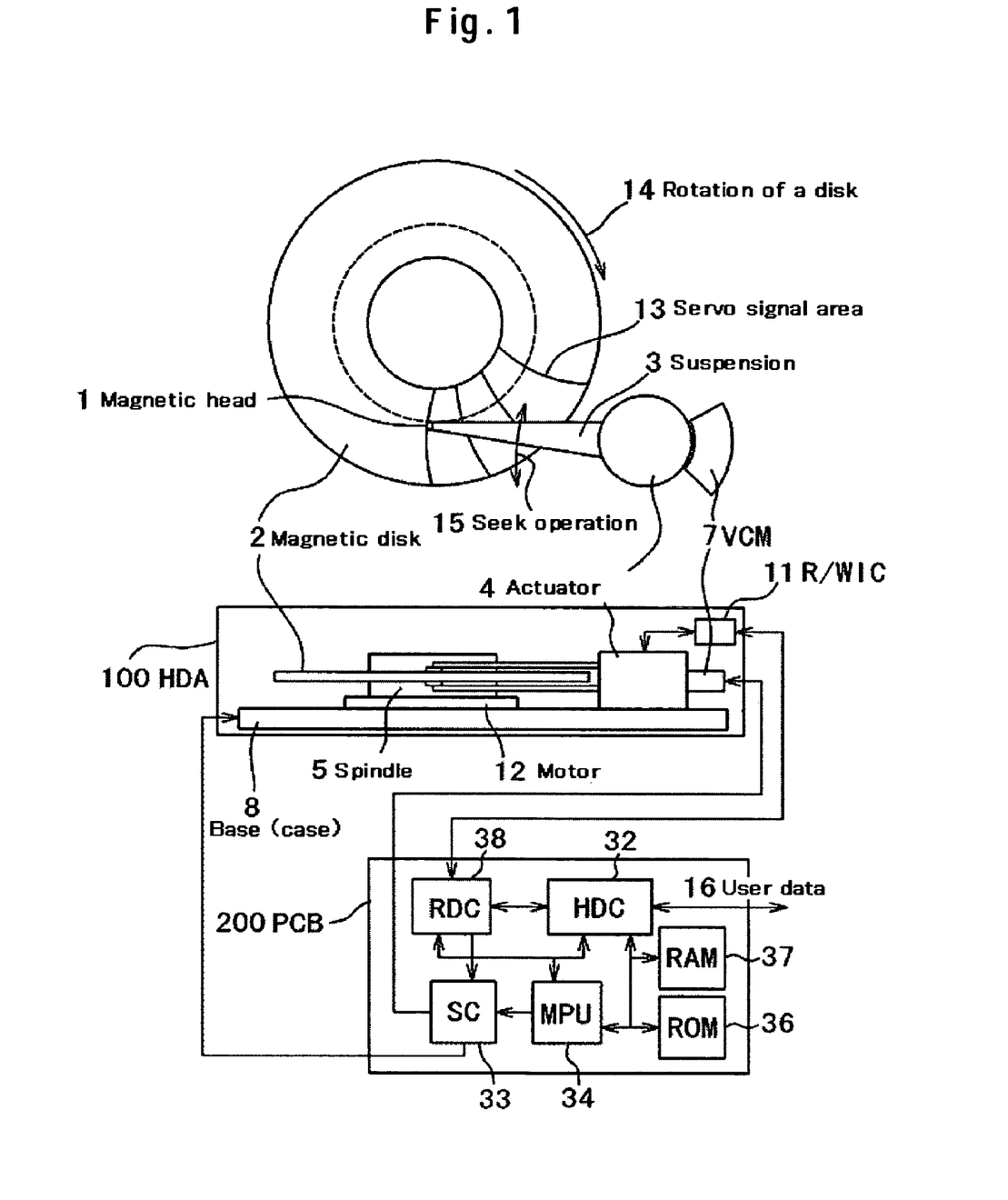
FIG. 1 is a diagram illustrating a configuration of a magnetic disk drive according to a first embodiment of the present invention.

A first embodiment of the present invention will be described with reference to FIGS. 1 through 4. In this embodiment according to the present invention, long sectors each having a length of 32 kB are applied to a magnetic disk drive (1.0-HDD) having a diameter of 1 inch. The 1.0-HDD includes a head disk assembly (HDA) 100 formed of a mechanical system, and a package printed circuit board (PCB) 200 mainly formed of a circuitry system. FIG. 1 is a diagram illustrating a configuration of the 1.0-HDD. The head disk assembly (HDA) 100 includes: a magnetic disk 2, which is built into a case (base) 8 using a spindle 5; a magnetic head 1 mounted at a tip of a suspension 3 that is connected to an actuator 4 driven by a voice coil motor (VCM) 7; and a flexible printed cable (FPC: not illustrated) on which a read write IC (R/W IC) 11 for electrically driving the magnetic head 1 is mounted. The head disk assembly (HDA) 100 performs write and read at an arbitrary position while the actuator 4 rotates the magnetic disk 2 at the fixed number of revolutions to move the magnetic head 1.

A signal of a servo signal area 13, which has been read by the magnetic head 1, is amplified by the R/W IC 11. Then, servo detection of the signal is performed in a servo detection circuit of a read channel IC (RDC) 38 of the PCB 200. According to the result of the servo detection, a microprocessor (MPU) 34 identifies the rotational speed of a motor and a position of the magnetic head 1, and then controls a servo controller (SC) 33. According to the control, the SC 33 precisely controls the rotation 14 of the disk at 4200 rpm by means of rotation control of a motor 12. In addition, the SC 33 controls the electric current of the VCM 7 of the actuator 4 to control seek operation 15 and track following operation.

Figure 2A:
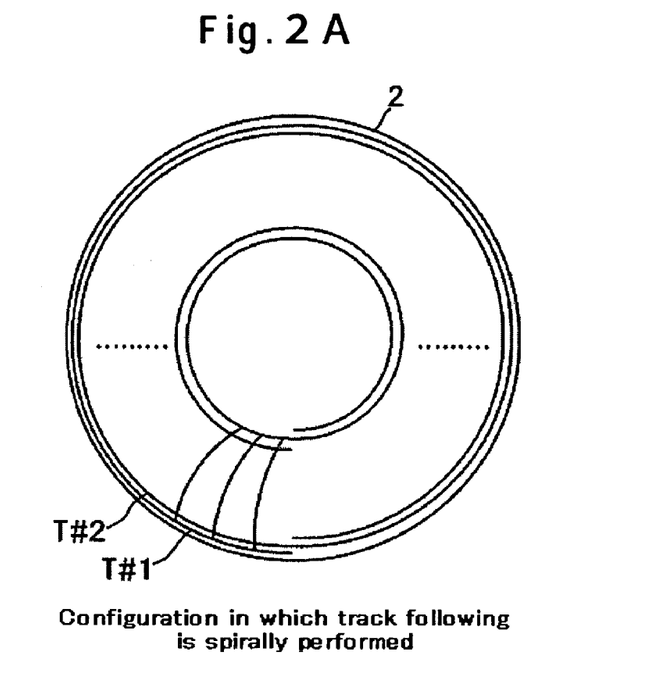
FIG. 2A is a diagram illustrating an example of how data tracks of a magnetic disk are configured.

In this embodiment, as shown in FIG. 2A, with the object of avoiding seek operation between tracks when successively performing write and read, the SC 33 performs spiral, continuous track following in the direction from the outer circumference diameter to the inner circumference diameter on the basis of the result of the servo detection by the RDC 38. Japanese Patent Laid-open No. 11-31367 details such a spiral servo technology for forming spiral data tracks.

According to the steps described later, the hard disk controller (HDC) 32 identifies a format of a data sector at a track position where read/write is performed. The hard disk controller (HDC) 32 then instructs the RDC 38 and the R/W IC 11 to carry out the read/write control. At the time of writing, the HDC 32 adds an error correction correcting code (ECC), etc. to a value of a RAM 37, into which user data 16 has been read out, before writing the value to a given area of the hard disk 2. At the time of reading, the RDC 38 decodes, into digital data, a magnetizing signal that has been read by the magnetic head 1 located at a specified position. Further, the HDC 32 checks for and corrects errors, and writes the data in the RAM 37. A ROM 36 includes a sequence of the magnetic disk 2 at the time of starting the HDD 100, a data format, and information required to read a management information area of the magnetic disk 2 (programs, and data used for control). The HDC 32 has modules that perform the various functions or steps described herein.

Figure 3:
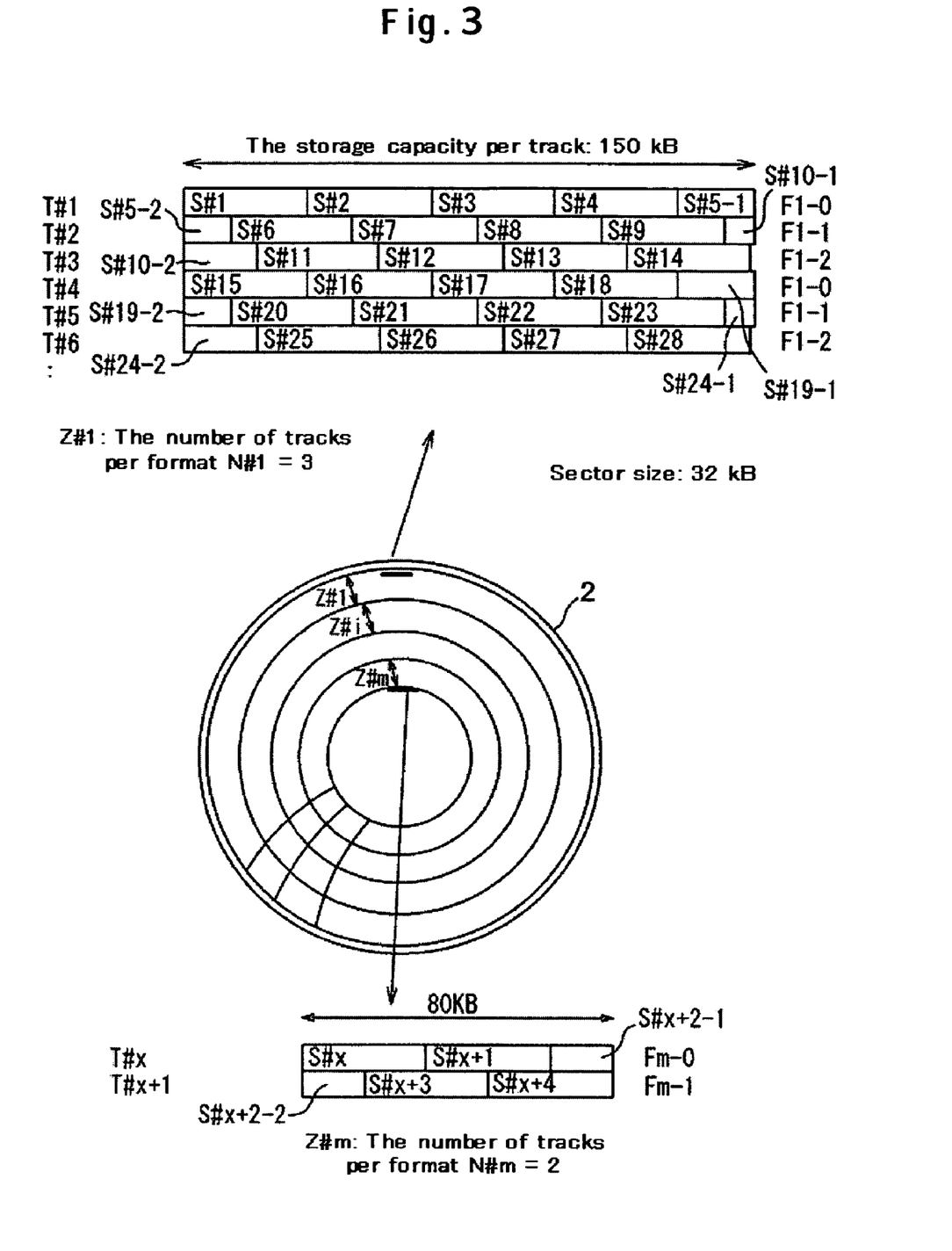
FIG. 3 is a diagram illustrating how a data format is configured according to the first embodiment of the present invention.

FIG. 3 is a diagram schematically illustrating long sectors each having a size of 32 kB, which are formatted on the magnetic disk 2. A write area of the magnetic disk 2 is radially divided into zones (Z#1-Z#m), the number of which is m. A recording frequency is decreased from the outer circumferential diameter zone (Z#1) toward the inner circumferential diameter zone (Z#m) so that the recording densities of zones may not largely differ from one another.

At a switching part of each zone, the switching time is required to switch a recording frequency of a synthesizer in the RDC 38 (ranging from several tens to several hundreds of μsec until the recording frequency becomes stable). In this embodiment, because a track is spirally formed, there is provided an idle running area corresponding to the switching time during which a recording frequency of the synthesizer is switched. In the idle running area, read and write are not performed. Although a slight loss occurs in this idle running area, the ratio thereof is extremely low. For example, if a zone having 1000 tracks is provided with an idle running area equivalent to 500 μsec, a format loss is 0.001% (=500 μsec/(70 msec×1000)).

A disk format of the outermost radius zone Z#1 is shown on an upper part of the figure. The storage capacity per track is 150 kB. In this zone, long sectors composed of each sector having a length of 32 kB are formatted with the number of tracks per format N#1=3. The number of tracks per format denotes a unit in which a track format is repeated.

In T#1, 32 kB are allocated to each of S#1 through S#4, and 22 kB are allocated to S#5-1 (F1-0 format). In the subsequent T#2, 10 kB are allocated to S#5-2, 32 kB are allocated to each of S#6 through S#9, and 12 kB are allocated to S#10-1 (F1-1 format). In T#3, 20 kB are allocated to S#10-2, and 32 kB are allocated to each of S#11 through S#14 (F1-2 format). The size of the remaining unrecorded area before T#4 is only 2 kB.

In the conventional formatting technology shown in FIG. 7, a format of which is completed at the end of each track, the size of an unrecorded area in each track is 22 kB (66 kB in three tracks). Here, the size of an unrecorded area can be reduced to 2 kB, which is a great improvement.

Track formats of T#4, T#5, T#6 are the same as those of T#1, T#2, T#3 respectively. To be more specific, on the assumptions that a track number in a zone is Tz, and the number of tracks per format in the zone is n, n possible track formats are repeated according to MOD n(Tz), which is a remainder obtained by dividing Tz by n.

A format of the innermost radius zone Z#m is illustrated in the lower part of FIG. 3. The storage capacity per track is 80 kB. In this zone, long sectors each having a length of 32 kB are formatted with the number of tracks per format N#m=2. In T#x, 32 kB are allocated to each of S#x through S#x+1, and 16 kB are allocated to S#x+2-1 (Fm-0 format). In the subsequent T#x+1, 16 kB are allocated to S#x+2-2, and 32 kB are allocated to each of S#x+3 through S#x+4 (Fm-1 format).

Although not shown, an example will be considered in which 2.6 data sectors per track are allocated by slightly increasing the recording density (83.2 kB). In this example, by formatting an area, the size of which is 416 kB, covering five tracks, it becomes possible to implement 13 data sectors (32×13=416 kB) without loss.

Figure 2B:
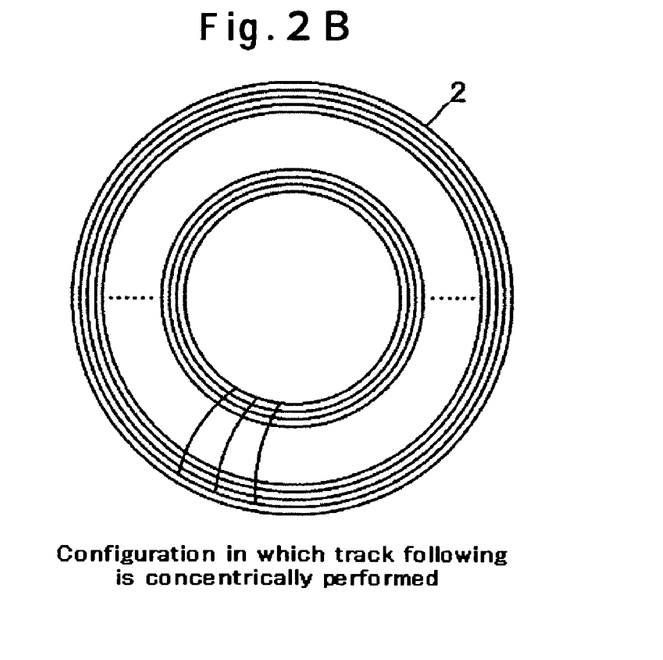
FIG. 2B is a diagram illustrating an example of how data tracks of a magnetic disk are configured.

It should be noted that in the combination with the spiral servo, a track moves to the next track without seek. Accordingly, the HDC 32 can handle S#5-1 to S#5-2 and S#10-1 to S#10-2 in the zone Z#1 in FIG. 3 in the same manner as those of the other long sectors, which makes it possible to easily realize the formats of F1-0 through F1-2. In addition, as compared with a configuration that concentrically performs track following as shown in FIG. 2B, the performance of sequential read/write is improved. Therefore, it is possible to shorten a period of time taken to read out a constant file, which makes it possible to reduce the operating time of a HDD, thus reducing the power consumption.

Moreover, if a format is configured to perform concentric track following, it is possible to identify any one of data sectors into which a track is physically divided.

Figure 4:
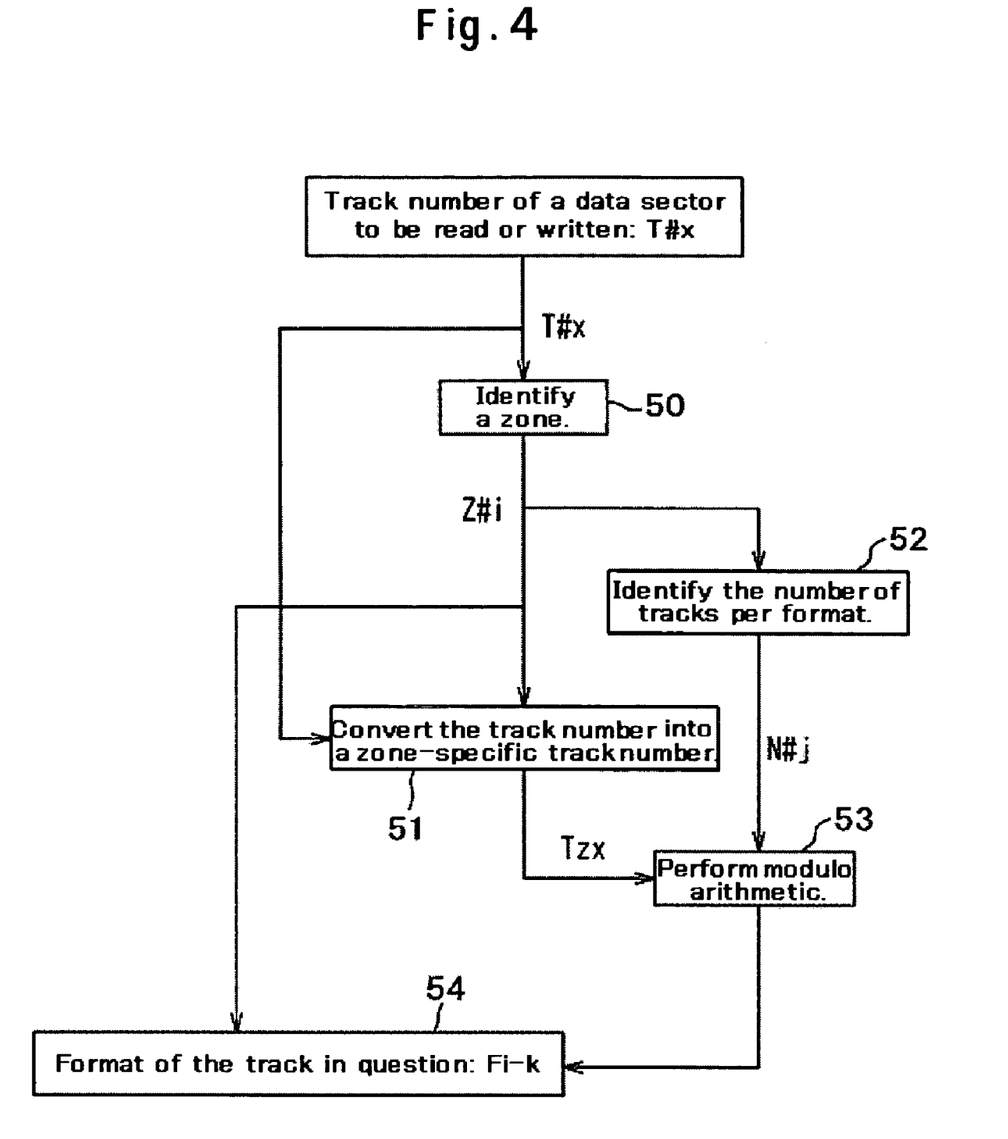
FIG. 4 is a diagram illustrating a sequence of determining a track format according to the first embodiment of the present invention.

FIG. 4 is a diagram illustrating a sequence of determining a track format. A zone Z#i is identified by a track number T#x of a track that includes a data sector from which read or write is started (step 50). Then, T#x and Z#i are used to convert the track number into a zone-specific track number Tzx (step 51). The number of tracks per format N#j in the zone is determined from the zone Z#i (step 52). A module transformation unit MOD then performs modulo arithmetic to calculate a k-value from N#j and Tzx (step 53), and thereby determines a track format Fi-k from Z#i and k (step 54). The modulo arithmetic by the module transformation unit MOD is integer arithmetic that determines a remainder by division. A remainder obtained by dividing a certain integer by an integer n is designated as "MOD n (a)".

According to this embodiment, because long sectors each having a length of, e.g., 32 kB can be efficiently formatted in the 1.0-HDD, an improvement in performance by ECC can be achieved. Additionally, the combination with the spiral servo makes it possible to improve the performance of sequential read and write, and to reduce the power consumption.

Incidentally, this embodiment adopts the combination with the spiral servo that spirally forms data tracks. However, it is obvious that even in a case where data tracks are concentrically formed as show FIG. 2B, a track format which is constituted of a plurality of tracks as shown in FIG. 3 can be applied in consideration of the seek time between tracks.

A second embodiment of the present invention will be described with reference to FIG. 5. In this embodiment according to the present invention, long sectors each having a length of 4 kB are applied to a magnetic disk drive (1.0-HDD) having a diameter of 1 inch. Because a point of difference between the first and second embodiments is a data sector, only this part will be described.

Figure 5:
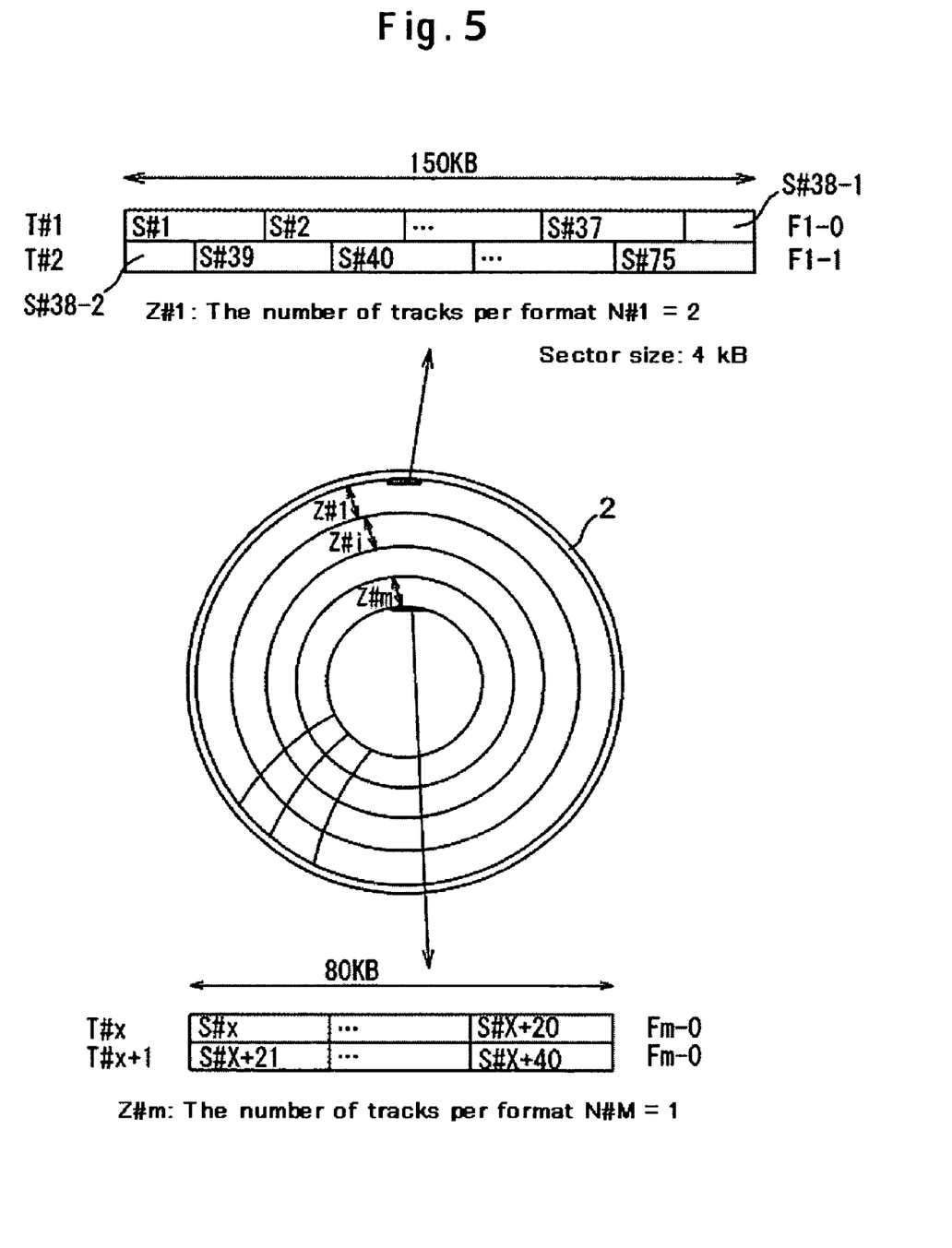
FIG. 5 is a diagram illustrating how a data format is configured according to a second embodiment of the present invention.

FIG. 5 illustrates a disk format. A disk format of the outermost radius zone Z#1 is shown on an upper part of the figure. The storage capacity per track is 150 kB. In this zone, long sectors each having a length of 4 kB are formatted with the number of tracks per format N#1=2. In T#1, 4 kB are allocated to each of S#1 through S#37, and 2 kB are allocated to S#38-1 (F1-0 format). In the subsequent T#2, 2 kB are allocated to S#38-2, and 4 kB are allocated to each of S#39 through S#75 (F1-1 format).

The storage capacity per track of the innermost radius zone Z#m is 80 kB. Accordingly, one track can be provided with 20 data sectors. To be more specific, because the number of tracks per format is N#m=1, this zone can be formatted by the conventional technology.

If the outermost radius zone Z#1 is formatted by means of the conventional technology, an unrecorded area having a length of 2 kB remains. Applying a format according to the present invention makes it possible to eliminate this unrecorded area. At this time, the efficiency of the format is improved by 1.1% (=80×2/150) on the assumption that a ratio of a readable/writable area excluding a servo area and an ECC area is 80%. More specifically, for a HDD such as a 1.0-HDD whose diameter is a small, even if the size of a long sector is as relatively small as e.g., about 4 kB, an improvement in format efficiency can be expected. It is needless to say that even when a HDD whose diameter is smaller than the abovementioned HDD (for example, 0.85-HDD), the same or more improvement in format efficiency can be expected.

A third embodiment of the present invention will be described with reference to FIG. 6. In this embodiment according to the present invention, long sectors each having a length of 32 kB are applied to a magnetic disk drive (3.5-HDD) having a diameter of 3.5 inch. Points of difference between the first and third embodiments are the size of a magnetic disk, and the number of disks. Since the structure of the HDD is almost the same as that in FIG. 1, the description thereof will be omitted.

Figure 6:
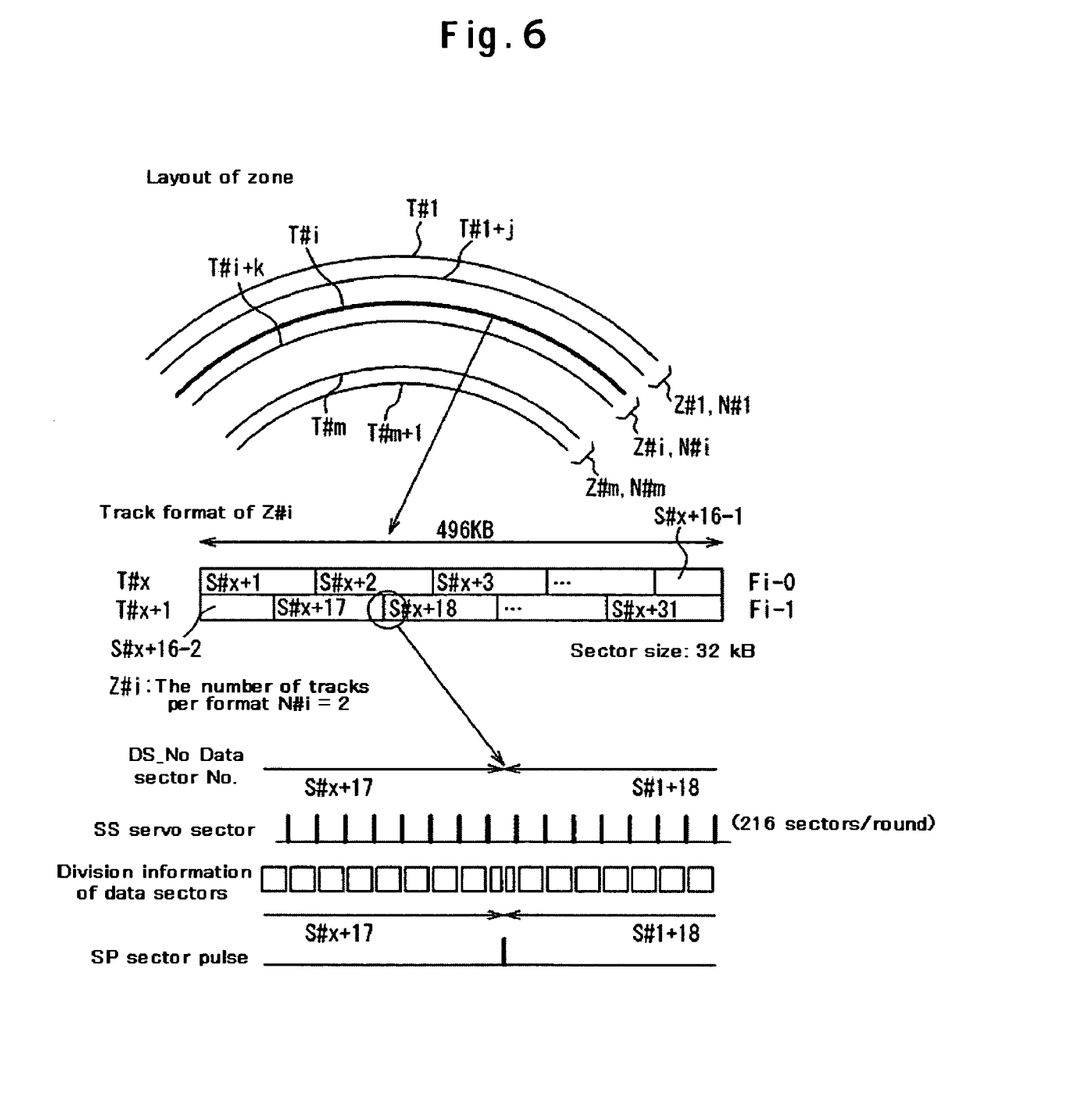
FIG. 6 is a diagram illustrating how a data format is configured according to a third embodiment of the present invention.

In FIG. 6, a layout of zones Z#1 through Z#m is illustrated in an upper part; a track format in Z#i is illustrated in a central part; and the relationship among a data sector DS, a servo sector SS, and a sector pulse SP is illustrated in a lower part.

A track in the zone Z#i in proximity to the middle circumference diameter has a write area, the round length of which is 496 kB. Setting a value of the number of tracks per format N#i in this zone Z#i at 2 makes it possible to eliminate an unrecorded area. In T#x, 32 kB are allocated to each of S#x+1 through S#x+15, and 16 kB are allocated to S#16-1 (F1-0 format). In the subsequent T#x+1, 16 kB are allocated to S#x+16-2, and 32 kB are allocated to each of S#x+17 through S#x+31 (F1-1 format).

A part including the end of the data sector S#x+17 and the start of the S#x+18 is illustrated in the lower part of FIG. 6. In this embodiment, the number of servo sectors SS per round is 216. Accordingly, the length of a data area between servo sectors is about 2.3 kB, which is much smaller than the size of a long sector to be applied (32 kB). The long sector is split by 13.9 servo sectors on an average. Because of it, in many cases, there is no sector pulse SP between servo sectors. The HDC 32, therefore, has only to control, in detail, formatting of data sectors on a track basis at a position between servo sectors where a data sector is switched.

At this time, in comparison with the conventional technology, the format efficiency is improved by about 2.6%(=80× 16/496) on the assumption that a ratio of a readable/writable area excluding a servo area and an ECC area is 80%. As compared with the small-diameter disk such as the 1.0-HDD, the effects are reduced. However, when long sectors are applied each of which has a length of 32 kB, the effects of the present invention can be expected. It is obvious that when a 1.8-inch, 2.5-inch, or 3.5-inch HDD is used, more effects can be expected.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A method for formatting data sectors on a magnetic disk having a plurality of tracks, each of said plurality of tracks being divided into a plurality of zones in a radial direction, said method comprising:

formatting, on a zone basis, said data sectors in units of N tracks (N is an integer, which is 2 or more);

wherein formatting, on a zone basis, said data sectors in units of N tracks (N is an integer, which is 2 or more) comprises:

identifying a zone that includes a track number of a data sector from which read or write is started;

identifying the number of tracks N corresponding to the zone;

converting the track number into a zone-specific track number in the zone;

performing modulo arithmetic of the zone-specific track number by the number of tracks N of the zone; and determining a track format of the N number of tracks from the identified zone and the result of the modulo arithmetic.

2. A method for formatting data sectors on a magnetic disk according to claim 1, wherein:

said data sectors are continuously formatted in the N tracks.

3. A method for formatting data sectors on a magnetic disk according to claim 1, wherein:

said tracks are spirally and continuously formed.

4. A method for formatting data sectors on a magnetic disk according to claim 1, wherein:

said tracks are concentrically formed, and each track has physically divided data sectors.

5. A method for formatting data sectors on a magnetic disk according to claim 1, wherein:

a value of N differs on a zone basis.

6. A magnetic disk drive comprising:

a magnetic disk having a plurality of tracks, each of said plurality of tracks being divided into a plurality of zones in a radial direction, data sectors being formatted, on a zone basis, in units of N tracks (N is an integer, which is 2 or more);

a spindle that supports the magnetic disk for rotation; and a magnetic head that is positioned at a recording track of the magnetic disk so as to write/read data to/from the data sector;

wherein a controller that identifies a zone that includes a track number of a data sector from which read or write is staffed, identifies the number of tracks N corresponding to the zone, converts the track number into a zone-specific track number in the zone, performs modulo arithmetic of the zone-specific track number by the number of tracks N of the zone, and determines a track format of the N number of tracks from the identified zone and the result of the modulo arithmetic.

7. A magnetic disk drive according to claim 6, wherein:

said data sectors are continuously formatted in the N tracks.

8. A magnetic disk drive according to claim 6, wherein:

said tracks are spirally and successively formed.

9. A magnetic disk drive according to claim 6, wherein:

said tracks are concentrically formed, and each track has physically divided data sectors.

10. A magnetic disk drive according to claim 6, wherein:

a value of N differs on a zone basis.

11. A magnetic disk drive having a controller which formats data sectors on a magnetic disk, on a zone basis, in units of N tracks (N is an integer, which is 2 or more), the controller having modules configured to:

identify a zone that includes a track number of a data sector from which read or write is started;

identify the number of tracks N corresponding to the zone;

convert the track number into a zone-specific track number in the zone;

perform modulo arithmetic of the zone-specific track number by the number of tracks N of the zone; and determine a track format of the N number of tracks from the identified zone and the result of the modulo arithmetic.

12. A magnetic disk drive according to claim 11, wherein: said data sectors are continuously formatted in the N tracks.

13. A magnetic disk drive according to claim 11, wherein: said tracks are spirally and continuously formed.

14. A magnetic disk drive according to claim 11, wherein: said tracks are concentrically formed, and each track has physically divided data sectors.

15. A magnetic disk drive according to claim 11, wherein: a value of N differs on a zone basis.

16. A magnetic disk drive according to claim 11, wherein: a diameter of the magnetic disk is 25.4 mm or less, and the length of one data sector is 4 kB or more.

* * * * *

UNITED STATES PATENT AND TRADEMARK OFFICE
CERTIFICATE OF CORRECTION

PATENT NO. : 7,612,960 B2  Page 1 of 1
APPLICATION NO. : 11/271365
DATED : November 3, 2009
INVENTOR(S) : Satoh et al.

It is certified that error appears in the above-identified patent and that said Letters Patent is hereby corrected as shown below:

In the Claims:

Claim 6, column 8, line 37, please delete "staffed" and insert -- started --

Signed and Sealed this

Twelfth Day of January, 2010

David J. Kappos
*Director of the United States Patent and Trademark Office*